United States Patent [19]

Leger et al.

[11] Patent Number: 5,077,737
[45] Date of Patent: Dec. 31, 1991

[54] METHOD AND APPARATUS FOR STORING DIGITAL DATA IN OFF-SPECIFICATION DYNAMIC RANDOM ACCESS MEMORY DEVICES

[75] Inventors: Geary L. Leger, Boise; Karl H. Mauritz, Eagle; Chris A. Unrein; Thomas W. Voshell, both of Boise, all of Id.

[73] Assignee: Micron Technology, Inc., Boise, Id.

[21] Appl. No.: 395,485

[22] Filed: Aug. 18, 1989

[51] Int. Cl.⁵ .............................................. G06F 11/00
[52] U.S. Cl. .................................... 371/10.1; 371/13; 371/21.6
[58] Field of Search ................... 371/10.1, 10.2, 10.3, 371/13, 21.6, 40.2, 2.2

[56] References Cited

U.S. PATENT DOCUMENTS

| | | | |
|---|---|---|---|
| 3,633,175 | 1/1972 | Harper | 371/10.2 |
| 4,051,354 | 9/1977 | Choate | 371/10.3 |
| 4,380,066 | 4/1983 | Spencer et al. | 371/10 |
| 4,393,474 | 7/1983 | McElroy | 364/200 |
| 4,398,225 | 8/1983 | Cornaby et al. | 360/39 |
| 4,413,339 | 11/1983 | Riggle et al. | 371/38 |
| 4,479,214 | 10/1984 | Ryan | 371/11 |
| 4,493,075 | 1/9185 | Anderson et al. | 371/10 |
| 4,506,362 | 3/1985 | Morley | 371/13 |
| 4,527,251 | 7/1985 | Nibby, Jr. et al. | 364/900 |
| 4,622,668 | 11/1986 | Dancker et al. | 371/20 |
| 4,768,169 | 8/1988 | Perlegos | 365/200 |
| 4,868,789 | 9/1989 | MacDonald | 265/200 |
| 4,939,694 | 7/1990 | Eaton et al. | 365/200 |
| 4,964,129 | 10/1990 | Bowden, III et al. | 371/40.2 |

Primary Examiner—Jerry Smith
Assistant Examiner—Ly V. Hua
Attorney, Agent, or Firm—Angus C. Fox, III

[57] ABSTRACT

A fault-tolerant memory system or "FTMS" is intended for use as mass data storage for a host computer system. The FTMS incorporates a dedicated microprocessor-controlled computer system which serializes blocks of user data as they are received from the host system, deserializes those blocks when they are returned to the host system, implements an error correction code system for the user data blocks, scrubs the data stored in the user memory, remaps data block storage locations within the user memory as initial storage locations therein acquire too may hard errors for error correction to be effected with the stored error correction data, and performs host computer interface operations. Data in the FTMS is not bit-addressable. Instead, serialization of the user data permits bytes to be stored sequentially within the user memory much as they would be stored on a hard disk, with bytes being aligned in the predominant direction of serial bit failure within the off-spec DRAM devices. Such a data storage method facilitates error correction capability.

14 Claims, 3 Drawing Sheets

METHOD AND APPARATUS FOR STORING DIGITAL DATA IN OFF-SPECIFICATION DYNAMIC RANDOM ACCESS MEMORY DEVICES

FIELD OF THE INVENTION

This invention relates to methods for constructing digital memory arrays from "off-specification" dynamic random access memory (DRAM) chips, and ensuring the fidelity of data stored in such arrays. More specifically, the invention provides an error-correction-enhancing data storage scheme wherein the bits of individual bytes of data are stored serially along device rows or device columns, depending on the most probable direction of serial bit disablement. Additionally, an on-board mapping system monitors defect density within the array, and substitutes functional spare logical block storage locations for those which have acquired defective bytes sufficient in number to jeopardize error correction function.

BACKGROUND OF THE INVENTION

A traditional computer memory hierarchy has developed as a consequence of the relative price and performance characteristics of available technologies. The fastest and most expensive memories are constructed from static random access memory chips; those constructed from dynamic access memory chips are somewhat slower, but considerably less expensive. Rotating magnetic media-based memory is dramatically slower than either of the aforementioned semiconductor-based memories, but its speed disadvantage is offset by a much lower cost per megabyte. Magnetic tape storage, which is far slower and considerably less expensive than rotating magnetic media-based memory, is at the bottom of the traditional memory hierarchy.

New technology and refinements of existing technology promise to alter the traditional hierarchy. Already, Bi-CMOS DRAM designs (arrays which incorporate transistors of both bipolar and CMOS varieties) have been announced. This type of DRAM array is expected to eliminate most of the four-fold speed advantage currently held by static random access memories (SRAMs). Additionally, the never-ending quest for faster processing speeds has led to the practice of buffering a large, relatively slow memory with a buffer constructed from relatively fast memory. For example, rather than constructing main memory exclusively from fast, but costly SRAMs, a relatively small, but high-speed SRAM cache memory is used to front-end a large DRAM main memory. Another example is the extensive use of semiconductor memories (either static or dynamic) as input-output buffers for tape drives and disk drives. The main reason for the use of semiconductor buffers in sequentially-accessed storage peripherals is the ability of such buffers to increase system throughput by reducing delays associated with the difference between the speed of the mechanical device and the speed of the system's semiconductor main memory. As optical storage technology becomes more sophisticated and less costly, it will likely begin to supplant sequentially-accessed magnetic storage.

As refinements of semiconductor manufacturing technology have simultaneously reduced the unit cost and increased the density of semiconductor memory, it has been used with increasing frequency in applications that were once the domain of rigid disk drives. In the past, semiconductor storage has quadrupled in capacity (density) roughly every three years, whereas rigid disk drives have only doubled in capacity within the same period. Given those trends, if the price curves for the two technologies are extended into the future, there is a crossover point where semiconductor storage becomes less expensive than rigid disk storage. Various estimates have placed that crossover point anywhere between the mid-1990s and the year 2000.

Semiconductor memory, configured as either a high-speed solid-state device (HSSD) or as a solid-state disk drive (SSDD), is already having an impact on the rigid disk drive market. The main difference between HSSDs and SSDDs is that the HSSD does not emulate a disk drive. In addition, HSSDs interface directly to very high-speed memory buses. Although the SSDD is typically a plug-in and run device, it is limited by the band width of the I/O channel and the overhead associated with emulating a disk drive.

Semiconductor memory configuration is highly application dependent. Certain applications such as design automation, seismic data processing, weather forecasting, scientific simulation, artificial intelligence and graphics imaging and animation require large system memories. Other applications, such as real-time simulation and data acquisition, can just as easily use semiconductor memory configured either as an HSSD or as an SSDD. For example, in data acquisition applications, data is beamed down from satellites to HSSDs that act as temporary storage buffers until the data can be off-loaded to permanent storage on disk or tape.

Because of the increased processor overhead, decreased system speed and additional memory burden associated with error correction, semiconductor chips used in main memory applications must generally be full specification. By full specification, it is meant that the chips are free of hard errors and demonstrate an acceptable soft error rate. Because HSSDs are generally connected to high-speed data buses, implementation of an error-correction system on such a device may also be counterproductive. However, in the case of SSDDs, where speed is already limited by the band width of the I/O channel and disk-drive-emulation overhead, the implementation of an error-correction system will degrade system performance almost imperceptibly.

Although the current cost of an SSDD is a minimum of $700 per megabyte, a number of emerging technologies and new packaging techniques which make complete or partial use of off-spec DRAMs could dramatically reduce the cost. One promising technique is wafer array memory technology, which is an extension of wafer scale integration. With this technology, a stack of wafers is vertically interconnected. Because this approach enables a manufacturer to use standard full-specification DRAMs together with less-than-perfect, "off-spec" DRAMS, production costs are dramatically reduced.

It would be highly desirable to be able to construct an SSDD exclusively from "off-spec" DRAM chips which would normally be considered worthless for main memory applications. Such a capability would dramatically reduce the cost of such an array.

SUMMARY OF THE INVENTION

The present invention provides for the construction of a Fault-Tolerant Memory System (FTMS) from "off-spec" DRAM devices. By using devices or chips which would normally be discarded as scrap, the cost of a SSHD can be reduced to less than $100 per megabyte. The FTMS is an error-correcting digital semiconductor storage device intended for use as auxiliary mass data storage for computers, including personal computers, mini-computers and mainframe computers.

The off-spec DRAM chips used for the construction of the FTMS may have a variety of defects which may include bad bits, an unacceptably-high soft error rate, and column or row continuity breaks that result in the disablement of a series of bits within the column or row so affected. Error-correctable logical blocks of data are stored within the array such that the bits of individual bytes are serially aligned in the direction that bit storage locations within the array are statistically most likely to be serially disabled. Such a data storage scheme optimizes the error correction capability of an on-board Reed-Solomon error correction system which assigns the same error weight to a byte having eight bad bits as to a byte having a single bad bit. Since the design of a particular DRAM device will determine whether defects will be more prev along array rows or along array columns, the FTMS may be addressed in either a row or a column mode so as to optimize error correction capability for the use of a particular device design. Additionally, an on-board mapping system monitors defect density within the array, substituting spare logical block storage locations for those which have acquired defective bytes sufficient in number to jeopardize error correction function.

Soft errors are intermittent, random errors triggered by alpha particles (helium nuclei), a component of the normal background radiation present in chip packaging materials and the materials from which the chip itself is fabricated. If a particle happens to bombard the N+ capacitive region of a DRAM cell, partial or total discharge of the cell's capacitor will occur. A soft error occurs when the capacitor is discharged to the point where the column sense amp improperly reads the cell charge value. A soft error can always be corrected by rewriting.

Hard errors, on the other hand, are the result of bad bits within a DRAM chip, and are traceable to permanent memory cell defects. A hard error cannot be corrected by rewriting.

The error correction system of the FTMS is capable of correcting both "hard" and "soft" errors. A process known as scrubbing is used to correct soft errors and to identify hard errors. Scrubbing incorporates an error correction code algorithm and is performed as a background task when there is no other read or write activity within the FTMS.

PREFERRED EMBODIMENT OF THE INVENTION

Array Architecture

The fault tolerant memory array (FTMS) which is the focus of the present invention is constructed from "off-spec" DRAM chips having a variety of defects which may include bad bits, an unacceptably-high soft error rate, and column or row continuity breaks which result in the disablement of a series of bits within the column or row so affected.

Figure 1:
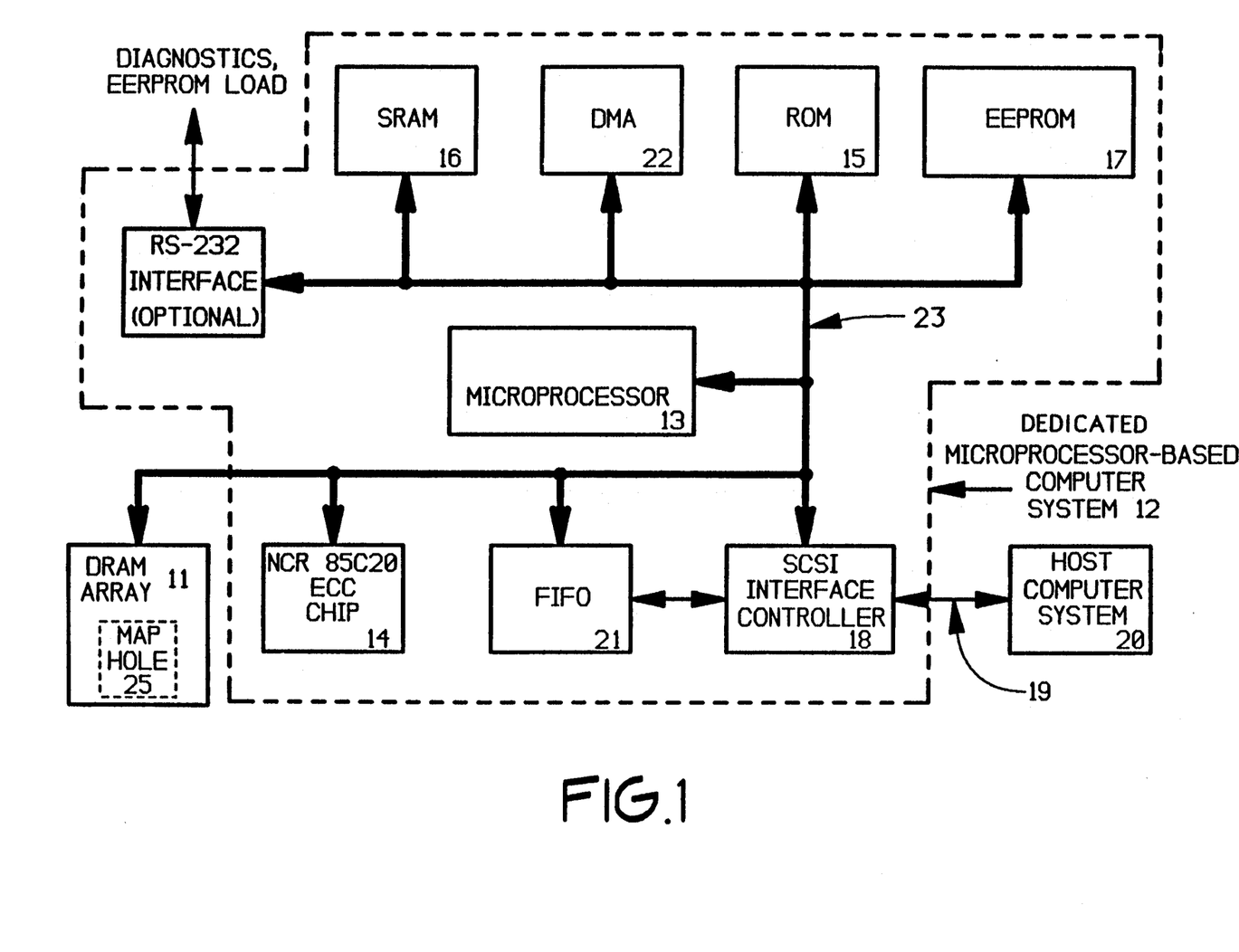
FIG. 1 is a block schematic diagram which provides an FTMS overview.

The block schematic diagram of FIG. 1 gives an overview of the FTMS. The FTMA is designed primarily for use as auxiliary mass data storage. The preferred embodiment of the invention described herein emulates a hard disk drive, but it could be just as easily configured for use as an optical disk drive emulator or spooler buffer. The FTMS comprises a user memory 11 constructed from at least one array of off-specification DRAM chips, and a dedicated microprocessor-based computer system 12, which serializes, deserializes, scrubs, and corrects errors in data stored in the user memory 11, determines when individual chips in the user memory 11 fail to the extent that they become unusable, maps the user memory 11 so that storage of data is diverted from those chips deemed unusable to other chips within array 11 that were initially designated as spares, and performs interface operations with a host computer system. Data is stored within DRAM chip array 11 in block format. Since the data is digitally manipulated, it is most conveniently stored in logical blocks consisting of $2^n$ number of bytes. For the preferred embodiment, user data is stored in 512-byte blocks. This size of block was chosen merely to accommodate the SCSI (Small Computer System Interface) between the dedicated system of the FTMA and host computer. A microprocessor 13 executes all control functions related to function of dedicated system 12. An NCR 85C20 "Glover" error correction chip 14 implements a Reed-Solomon-4 (RS4) error correction code for user data that is stored within user memory 11. Software for dedicated system functions is stored in a read-only memory (ROM) 15. The FTMS error correction system comprises the Glover chip 14, a portion of the certain dedicated system software stored in the ROM 15, and the imbedded microprocessor-based computer system 12. A full-specification static random access memory (SRAM) 16 provides temporary storage for user data as it is being serialized or deserialized, between the words "provides" and "storage" dedicated system stack storage, storage location quality indicator counters, and other program operating variables within the dedicated system. An electrically-erasable programmable read-only memory (EEPROM) 17 contains an user memory map and other diagnostic routines. A parallel SCSI controller 18 provides an interface between the FTMS and the SCSI bus 19, which interconnects the FTMS to host computer system 20. Another type of parallel interface such as DEC's storage module device (SMD) interface or a serial interface, such as the Enhanced Small Device Interface (ESDI) or Storage Technology's ST506 interface, could be used in place of the SCSI 18. A First-In/First-Out (FIFO) buffer 21 is used to match the timing of the dedicated system 12 that that of SCSI controller 18. Direct Memory Access (DMA) 22 is used for rapid transfer of data on the parallel bus 23 of dedicated system 12 that interconnects user array 11, microprocessor 13, error correction chip 14, read-only memory 15, SRAM memory 16, EEPROM memory 17, SCSI controller 18, FIFO buffer 21 and DMA 22.

SCSI traffic consists of commands and data. Both command structure and data format for the SCSI bus 19 have been dictated by established SCSI protocol. Data transfers are managed by block number, in this case a logical block, and originate at an initiator site and terminate at a target site. The FTMS is considered a SCSI target device. Data transfers from initiator to target will be in blocks of 512 bytes each. When a 512-byte block of user data is sent to the FTMS, the SCSI controller 18 receives the data in parallel form, byte by byte, and under microprocessor control, passes the data to the FIFO 21. The FIFO 21, once full, signals the SCSI controller 18 that it can no longer accept data, and the data transfer is halted while the data within the FIFO 21 is routed to the Glover chip 14 for processing. The Glover chip 14 performs a polynomial division, computing 32 additional check bytes which are appended to the end of the 512-byte block of user data. The resulting 544 -byte logical block is stored as four interleaves of 136 bytes each. The logical block is then sent to a working buffer within the SRAM 16 for temporary storage. Consider this working buffer to be an X-Y array 8 bits wide in the X direction and 544 bits deep in the Y direction. Data is stored with bytes aligned in the X direction. However, data is read from the buffer in the Y direction 16 bits at a time and presented in parallel, 16 bits at a time, to the user memory for storage. Therefore, following eight reads and eight writes, two bytes have been transferred to the user memory. The process continues until the entire contents of the working buffer have been transferred to the user memory 11. It will be noted that the logical block storage format within the user memory 11 is much the same as the sector storage format within rotating media memory. The purpose of this unusual user memory storage format will become evident when the user memory architecture is explained.

When a logical block is read from the user memory, it is loaded into the working buffer within SRAM 16 in the reverse order that it was originally read from it. The logical block, consisting of the four, 136-byte interleaves, is then sent to the Glover chip 14, which performs another polynomial division on the input data, the remainder of which will be zero if no errors have occurred. If the remainder is zero, then the 512 bytes of user data are used as is. Otherwise, the data represented by the non-zero remainder is used by dedicated system software to solve for error locations and the value of the error correction mask.

The Reed-Solomon error correction code operations performed by the Glover chip 14 could be implemented entirely with dedicated system hardware and software. However, use of a chip such as the Glover chip greatly simplifies the process. Because the Glover chip 14 was designed primarily for error correction of data stored on a disk drive, data is stored in an interleaved format in order to improve burst error correction capability. Burst errors, although virtually nonexistent within a semiconductor array, are a relatively common occurrence on a disk drive, where a defective portion of media will result in a stream of defective bits. Hence, an interleave factor is used for the FTMS only because the Glover chip 14 imposes the condition. Although the interleave factor does little or nothing to enhance error correction capability within the FTMS, the relatively low cost and ready availability of the chip outweigh this minor nuisance of unneeded additional complexity. Since the interleave process performed by the Glover chip 14 is a transparent operation, it will not be dealt with in further detail.

The Reed-Solomon-4(RS4) error-correction code implemented by the Glover chip 14 is capable of correcting up to four defective bytes per 136-byte interleave (hence the "4" in the code designation). In addition, the code is capable of correcting a defective 8-bit byte, no matter how many bits are bad. Hence, a byte with eight defective bits has the same weight in the error-correction scheme as does a byte with a single defective bit. Given such an arrangement, it is desirable, whenever a particular type of DRAM device exhibits a series of defective bits, to address the device such that individual bytes are aligned in the direction of the defective series. Whether defects are more prevalent along device rows or along device columns will depend on the design of the particular semiconductor device. For example, if a DRAM chip is designed such that individual cells within a column are interconnected by a metal bit line, particle contamination during the manufacturing process will often interfere with bit line formation, resulting in a column break at any point in the column. If such a break resulted in half of the 1024 cells in a particular column of a 1-megabit DRAM being rendered useless, and we were to store information so that bytes were aligned along rows, 512 defective bits would fall within 512 bytes. Although each of the 512 bytes has only a single bit error, the RS4 error correction system assigns the same error weight to each defective byte as though each had 8 defective bits. Such a data storage scheme would dramatically increase the error correction burden to the point where the chip would be unusable. However, if the information is stored serially, such that bytes are aligned along columns, 512 bits will fall within only 64 bytes. The error correction system can much more easily cope with 64 defective bytes than with 512. By using the user memory storage format heretofore described, the memory designer can enhance error correction capability within a memory by choosing to store bytes serially along either device columns or device rows, depending on the defect concentration of a particular DRAM device.

Figure 2:
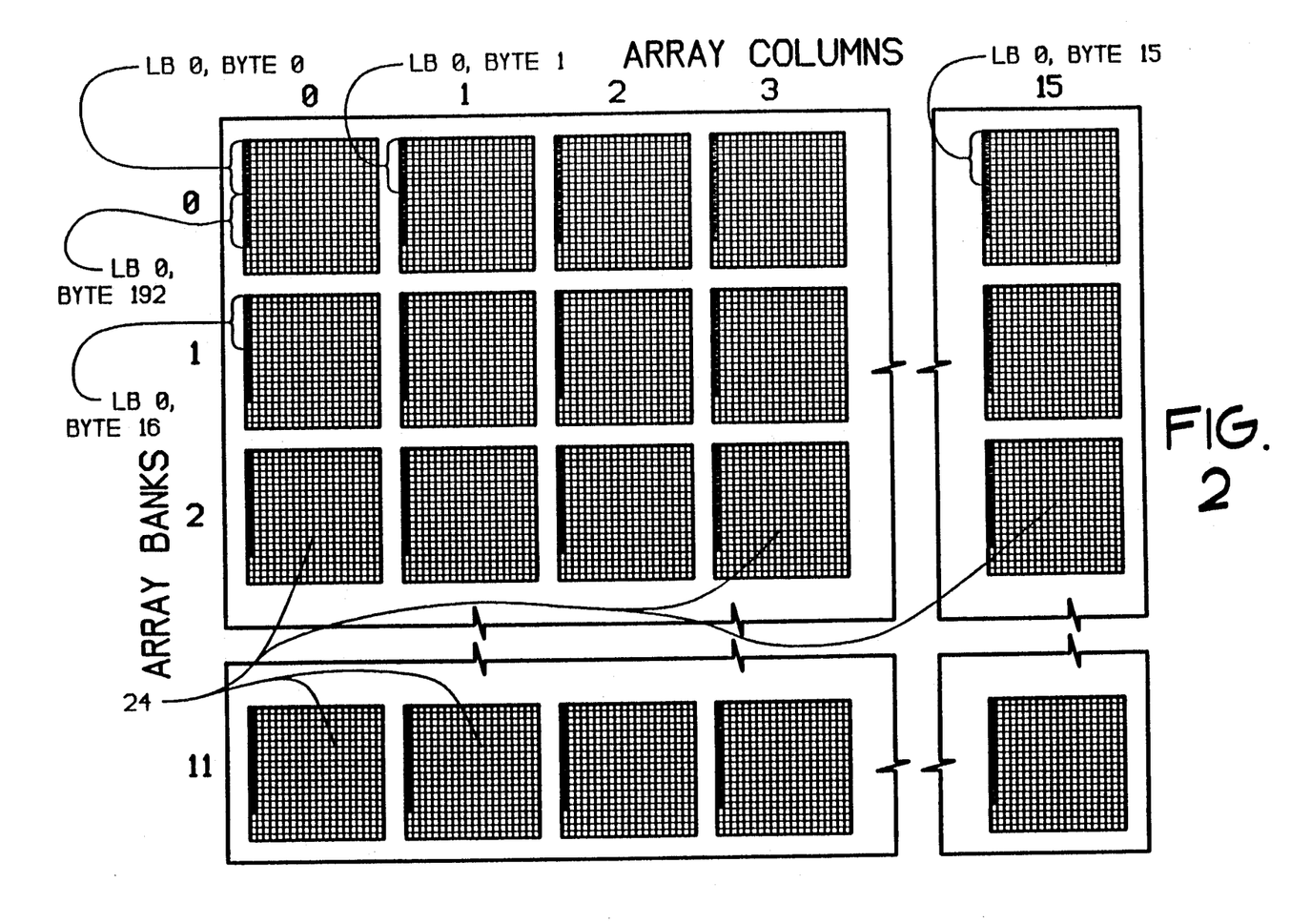
FIG. 2 is a block diagram which depicts array layout and the data storage scheme at both the array level and the device (chip) level.
Figure 3:
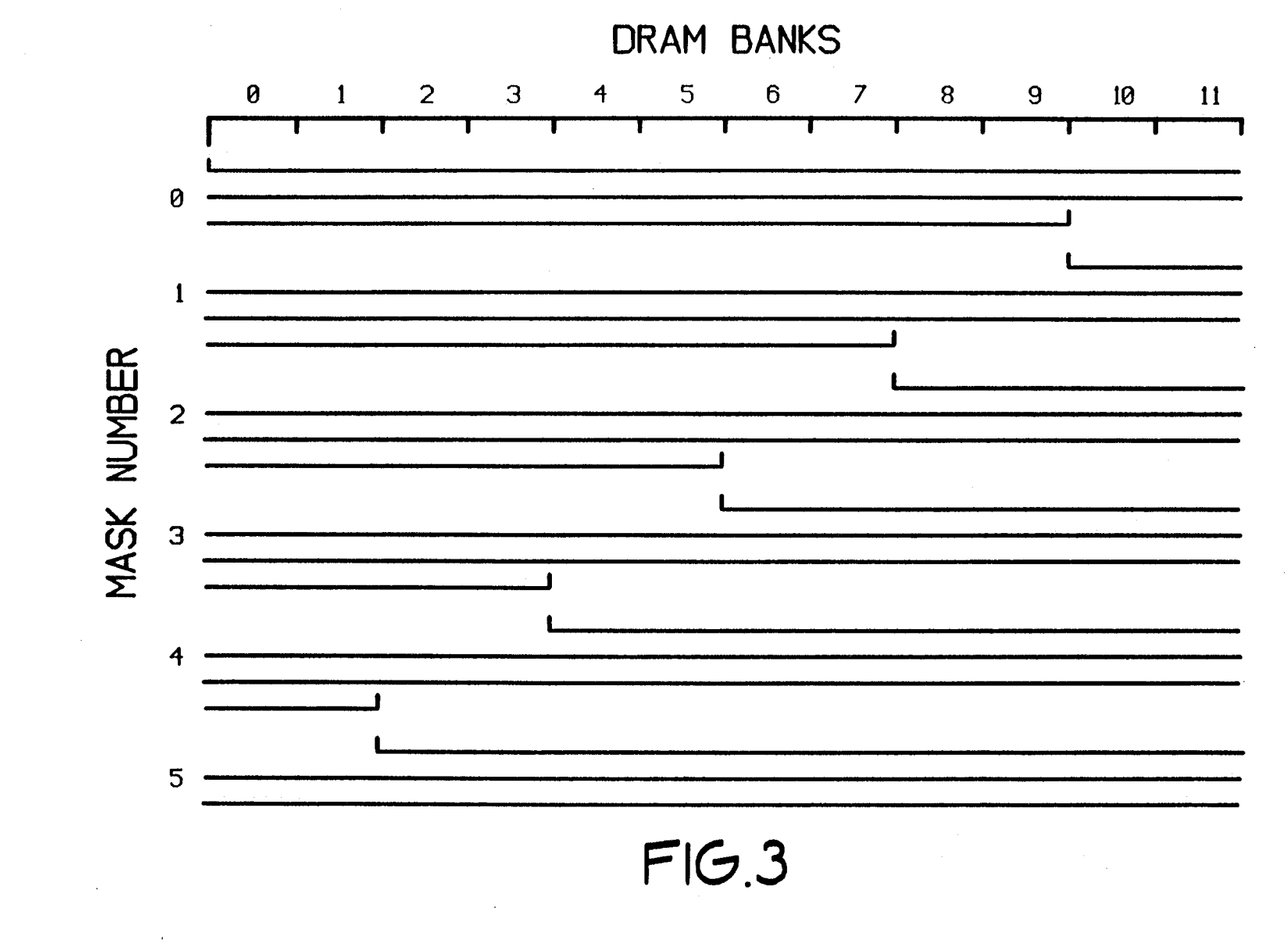
FIG. 3 is a mask pattern for storing 544-byte logical blocks within an array consisting of 12 banks, with each bank having 16 1-megabit devices or chips.

Referring now to FIG. 2, an architecture for the user memory 11 will be described that is based on a memory board having 192 1-megabit dynamic random access memory (DRAM) memory devices (chips) 24 that are arranged in a memory array twelve, sixteen devices banks. Although multiple arrays may be constructed on a single memory board, it will assumed that a memory board is equivalent to a single two-dimensional array. The user memory 11 may also be a complex array, being constructed from multiple boards. For the sake of simplification, DRAM devices 24 having only 20 rows and 20 columns are shown. The actual 1 megabit DRAM chips used for the preferred embodiment of the FTMS described herein have 1024 rows and 1024 columns. The byte storage scheme that will be described is optimized for DRAM devices having series of defective bits aligned primarily along device columns. FIG. 2 also depicts the storage sequence of bytes within the 12 bank by 16 device array. In order to better clarify the storage scheme, the addresses of various bytes within logical block 0 (zero) are shown. The same column of each device in a bank is simultaneously addressed by a 10-bit-wide, multiplexed data bus. Each of the 16 chips within bank 0 is sequentially loaded with a single byte one bit at a time, following which each of the 16 chips within bank 1 is sequentially loaded with a single byte, and so forth, until all 544 bytes of a logical block have been written to the array. Given such a sequential storage sequence, 34 bank shifts will be required to write one 544-byte logical block. Since 34 banks are used to write a single logical block instead of 36 (an even multiple of 12), it is unavoidable that the logical block bank address boundaries are not the same for each logical block. For this array architecture, a logical block may begin on only one of six banks (0, 2, 4, 6, 8 or 10). Therefore, there are 6 distinct patterns or "masks" that any given logical block may have. FIG. 3 is a diagram which indicates which mask is associated with a particular bank.

The addressing scheme, which results in the 6 distinct masks, is developed as follows:

To read logical block 0, column 0 and rows 0-7 on banks 0-11 are selected for the first 192 bytes; column 0 and rows 8-15 on banks 0-11 are selected for the second 192 bytes; and column 0 and rows 16-23 on banks 0-9 are selected for the remaining 160 bytes. To read logical block 1, column 0 and rows 16-23 on banks 10 and 11 are selected for the first 32 bytes; column 0 and rows 24-31 on banks 0-11 are selected for the next 192 bytes; column 0 and rows 32-39 on banks 0-11 are selected for the next 192 bytes; and column 0 and rows 40-47 on banks 0-7 are selected for the remaining 128 bytes.

Blocks 2, 3 and 4 are read in a similar manner. To read logical block 5, column 0 and rows 112-119 on banks 2-11 are selected for the first 160 bytes; column 0 and rows 120-127 on banks 0-11 for the next 192 bytes; and column 0 and rows 128-135 on banks 0-11 for the final 192 bytes.

In summary, to read logical blocks 0-5, column 0 and rows 0-135 on all twelve banks are selected. Such a reading operation requires that the microprocessor 13 cycle through the banks exactly 17 times. With 1024 rows on a 1-megabit DRAM chip, the number of logical blocks that fit on a single column is (1024/136)*6 or 45.18.

Therefore, to find the starting row for reading logical block 42—the next block following 7 complete, 6-block mask patterns—the starting row in column 0 will be 136*7 or 952. So, to read the entire logical block 42, column 0 and rows 952-959 on banks 8-11 are selected for the first 192 bytes; column 0 and rows 960-967 on banks 0-11 are selected for the second 192 bytes; and column 0 and rows 968-975 are selected for the remaining 160 bytes.

In a like manner, logical block 44 can be read by selecting column 0 and rows 992-999 on banks 8-11 for the first 64 bytes; column 0 and rows 1000-1007 on banks 0-11 for the next 192 bytes; column 0 and rows 1007-1015 on banks 0-11 for an additional 192 bytes; and column 0 and rows 1016-1023 on banks 0-5 for the remaining 96 bytes.

Following the accessing of logical block 44, 8 rows on 6 banks on column 0 remain that have not yet been accessed. This represents 768 bits or 96 bytes. Since this number of bytes is not sufficient for an additional whole 136-byte interleave, the bytes are simply discarded to prevent the addressing scheme from becoming overly complex. The discarded bytes represent less than half a percent of the available memory in the array—far less than the 6 percent of the memory that is dedicated to error correction code overhead.

Scrapping the last 8 rows on banks 6-11 allows for a full 45 logical blocks per column. The entire array of FIG. 2, consisting of 12 banks of 16 chips contains 1024*45 or 46,080 logical blocks, of which 1024 are reserved for spare logical blocks, which may be substituted as needed for blocks which either contain too many defects at the outset, or acquire too many defects during the array's useful life. Thus, 45,056 logical blocks (numbered 0 through 45,055) are available for user data storage. This equates to 23,068,672 bytes of user storage.

For the sake of convention, is should be noted that data is stored within the user memory 11 in block format. Each block, known as a logical block, contains a fixed number of user data bytes and a fixed number of error correction bytes associated with the user data bytes. The location within the user memory 11 where a logical block is stored is referred to as a logical block storage location. Each logical block storage location is identified by a beginning address within the user memory 11.

Any number of boards can theoretically be combined into a solid-state disk drive. The solid-state disk drive that is the focus of the present invention has been designed on the assumption that it may hold as many as eight boards, each of which contains a 16×12 array. If two boards are used, there are 2×46,080 or 92,160 logical block storage locations, of which 2048 will be reserved for the map hole 25. These reserved logical block storage locations are numbered 45056-46079 and 91136-92159. Nonreserved logical block storage locations are available to the user. If eight boards are used, 368,640 logical blocks may be stored. Clearly, an algorithm must be developed with which the beginning address of any logical block may be determined, given its number.

If 368,640 logical blocks are present, 19 bits are required to store the logical addresses thereof. Dividing the 19-bit logical address by 46,080 (the number of blocks within a single board array) yields a first integer quotient $IQ_1$ between 0 and 7 (a 3-bit address) which defines which of the eight boards is to be selected, plus a remainder $R_1$, between 0 and 46079 (a 16-bit address) which defines the number of a particular logical block on the board selected. Dividing this 16-bit remainder $R_1$ by 45 yields a second integer quotient $IQ_2$ between 0 and 1023 (a 10-bit address) which defines which column to select, address) which defines the number of the logical block on the column. Dividing this 6-bit remainder ($R_2$) by 6 yields a third integer quotient $IQ_3$ between 0 and 7 (a 3-bit address), which is used to compute the beginning of the row offset, plus a remainder, $R_3$, between 0 and 5 (a 3-bit address) which identifies which mask the logical block will use.

The 3-bit remainder, $R_3$, is used as the input address of a lookup table that contains the beginning bank address and another component of the beginning row offset. There are 12 banks, 0-11, so the bank addresses require 4 bits. The second row offset component has values between 0 and 112, requiring 8 bits. This lookup table is given below:

| $R_3$ | Beginning Bank | Second Offset |
|---|---|---|
| 0 | 0 | 0 |
| 1 | 10 | 16 |
| 2 | 8 | 40 |
| 3 | 6 | 64 |
| 4 | 4 | 88 |
| 5 | 2 | 112 |

The beginning row offset, BRO has two components, the Q3 quotient (3 bits) determined above and the 8-bit offset from the lookup table. The BRO=136×Q3+the 8-bit offset. The algorithm has provided the board address (3 bits), the column address (10 bits), the beginning bank address (4 bits), and the beginning row offset, BRO, (10 bits). These four addresses uniquely define where a particular logical block begins.

Alternatively, at the expense of a larger look-up table having 45 entries, the last division can be eliminated, requiring that the beginning bank address and the 10-bit BRO be stored therein. Given such a technique, board number, column number, and LB number (R2) can be equated with head, cylinder, and sector addresses, respectively. The controller would then perform an additional decoding step to convert the sector addresses into the beginning bank address and the BRO. Thus the FTMS, configured as a solid-state disk drive, would appear to the host computer system 19 like a fixed disk drive with 2 to 8 heads, 1024 cylinders, and 45 sectors per track.

Given a head, cylinder, and sector address for a logical block, the following algorithm will fill the FIFO buffer 20 with the 544 bytes in the LB:
HEAD=BOARD;
CYL=COL;
Address the look-up table with the SECTOR number,
Fetch the BANK and BRO;
For j=0 to 7;
Fetch [BOARD, BANK, COL, BRO+j]
End;
!The IC data lines have each shifted out one byte.
For i=1 to 33;
!increments BANK number
  BANK=BANK+1 (mod 12);
!Increments BRO
If (BANK=0) then
BRO=BRO+8;
For j=0 to 7;
  Fetch [BOARD, BANK, COL, BRO+j];
!The IC data lines have each shifted out one byte.
End;
!All 544 bytes have now been shifted out of the IC data lines.

A generalized algorithm can be developed for the starting location of a logical block within a user memory having A number of boards, B number of banks, C number of devices within a bank, N number of 8-bit bytes in a logical block, and K number of bits per device column and row, on the basis of its serialized logical block number (LBN). The starting location is identified by board number (A), array device column number (DCN), beginning bank number (BBN), and beginning row offset (BRO).

It can be shown that the number of logical block storage "masks", M, is the smallest integer such that B*C divides N*M with no remainder. Therefore, T (the integer representing the number of passes through the B banks of the array to access M*N bytes, or M LBs)=N*M/B*C. In order to determine the number of device rows that will be utilized to access M logical blocks, we must multiply T by eight (the number of bits in a byte).

Therefore, $Q_c$ (the number of LBs that can be in all like-numbered device columns within the array)=INT[K/8T]*M: and $Q_a$ (the number of LBs that can be stored within the array)=$Q_c$*K.

A (the board number) is derived by dividing the logical block number (LBN) by INT [k/8T]*M*K. This gives a first integer quotient (a number between 0 and A) which is the board number, plus a remainder $R_1$;

DCN (the array device column number) is a number between 0 and K, and is derived by dividing $R_1$ by INT[K/8T]*M, which results in a second integer quotient, which is DCN, and a remainder $R_2$;
 BBN (the LB's beginning bank number)=
 [B-$R_3$*B/M]modulo B; and $R_3$ is derived by dividing $R_2$ by M, which results in a third integer quotient $IQ_3$ plus remainder $R_3$; and
 If $R_3$=0, then BRO=$IQ_3$*8T;
 Else, if $R_3$=1, then BRO=($IQ_3$*8T)+8*B/M;
 Else, BRO=($IQ_2$*8T)+8*B/M+($R_3$-1)(B/M+1)*8.

Distribution of Bad Bits

Since partially-defective chips are used to construct the user memory, let us make the conservative assumption that at the time the user memory 11 is assembled and tested (T=0), each of the 192 DRAMs 23 within the user memory array has one column break affecting 512 bits, in addition to 10 random single bit errors. Since bytes are aligned along columns, 512 defective bits result in only 64 defective bytes. Then the probability that a byte is bad is:

$$p=(64+10)/1M/8=5.65E-4.$$

The distribution of 136-byte interleaves with i=0,1,2, . . . bad bytes at time T=0 is binomial b(n=136, p=5.65E−4). The following table lists the probability that a 136-byte interleave has N bad bytes at T=0:

| i | Probability (N = i) |
|---|---|
| 0 | 0.9260 |
| 1 | 0.0712 |
| 2 | 0.0027 |
| 3 | 0.0001 |

The probability that an interleave has two or fewer bad bytes at time T=0 is 0.9999. Since there are 4*45*1024=184,320 interleaves within the array, at time T=0, (184320)(1−0.9999) or 18 logical blocks with 3 or more bad bytes would be expected; likewise, at time T=0, 516 logical blocks with 2 or more bad bytes would be expected. The decision of when to substitute a logical block (whether at 2 or more, or 3 or more bad bytes per interleave) will depend on the relative overhead cost of performing the extra error correction on each read versus the overhead cost of searching a larger map list of substitute logical blocks on each read.

Mapping

Mapping is a process whereby usable spare logical block storage locations are substituted for those which have accumulated so many defective storage locations that future error correction operations may be compromised. In order, to implement a mapping scheme, a portion of the user memory 11 is reserved as a "map hole" 25 (depicted in FIG. 1). The map hole 25 is used as a spare logical block storage region pool.

An indexed mapping technique is used by the FTMS to determine the location of a logical block storage location that will be or that has been relocated (remapped) because one or more of its four interleave storage locations, has registered an error weight greater than three during a scrub cycle (the next section of this disclosure which discusses the scrubbing process deals with the concept of error weight in more detail). A section in the EEPROM 17 contains a single Logical Block Quality Indicator Bit (LBQIB) for each logical block storage location (including spare locations in the map hole 25) in the user memory 11. Initially, the LBQIB for each logical block storage location is set to "0". When the scrub cycle determines that a particular logical block storage location contains one or more interleave storage locations that have an error weight greater than or equal to three, the LBQIB for that logical block is set to "1". At this point, a record is TM-established in another section of the EEPROM 17 which contains the number of the logical block to be relocated and the beginning address of the next available logical block storage location within the map hole 25. This record will form one of a number of similar entries in a logical block relocation table.

Whenever the FTMS performs a read or write operation, a quick search of the LBQIB table in the EEPROM 17 is performed in order to determine the integrity of the originally-designated storage location. If the LBQIB for a particular logical block is set to "1", another search is performed which retrieves the applicable relocation record from the EEPROM 17 containing the reassigned storage region beginning address in the map hole 25.

Scrubbing

Scrubbing is a background task of the dedicated microprocessor-based computer system 12, the function of which is to locate data storage errors within the user memory 11, correct those which are soft errors, signal microprocessor 13 that an user memory remapping operation must be performed whenever one of the four interleave storage locations that constitute a logical block storage location has an error weight that exceeds a predetermined value, and maintain a count of the number of bad bytes on every DRAM device 24.

Scrubbing is accomplished by performing two dummy read cycles, and passing the accessed data through the error correction system to locate data errors. If an error is detected on the first cycle, it is corrected and re-written as if it were a soft error. If the same error is detected on the second cycle, the error is considered a hard error. If the total error weight in any interleave storage location exceeds three (as calculated by the error correction system), microprocessor 13 is flagged and an user memory remapping operation is initiated.

The scrubbing process can also identify defective DRAM devices. This is important because once a DRAM device 23 is determined to be defective, data from memory locations within the failed device will be considered "erasure" data by the error correction system.

The RS-4 ECC system recognizes two types of faults: errors and erasures. Their relative importance to error correction is known as weight. The job of an error correction system is two-fold. The system must determine both the location of the fault and the value of the error. By definition, the location of an erasure is known. An error has a weight of one; an erasure has a weight of one-half.

Within the RS4 error correction scheme, a complete chip failure, once it is recognized as such, contributes one-half the weight of other errors. This is so because recognized chip failures are treated as erasures, and microprocessor 13 need only compute appropriate error masks for "erased" bytes associated with the failed chip, since its memory locations are known and invariant.

The following method is used to identify defective DRAM devices. A section of the EEPROM 17 is reserved for the storage of a Device Quality Indicator Bit (DQIB) for each DRAM device 24 within the user memory 11. At time zero, all DQIBs are set to "0", which indicates that all DRAM devices 24 are deemed good. In addition, a counter is maintained within the SRAM for each DRAM device 24. This counter will be reset each time that a scrub cycle is completed for the entire user memory 11. Each time an error is detected during a scrub operation, imbedded system ECC software determines which of the DRAM devices 24 within the user memory 11 contains the byte where the single-bit or multiple-bit error occurred (the error correction process is only able to correct bytes, not bits), and the imbedded microprocessor increments by one the counter which corresponds to that device. If, during a complete scrub cycle, the counter is incremented beyond a predetermined value, the DRAM device may be considered defective. In this case, a Device Quality Indicator Bit (DQIB) representing the particular failing DRAM device will be set to "1". During subsequent scrub and read cycles, any data stored within a memory location on that particular DRAM device will be considered an erasure.

Consider the following scrubbing algorithm:
Scrub Cycle for Logical Block (LB) #N
Read the LB from the array and perform ECC operation;
If error count > 0, then do;
Write the corrected LB back to the user memory;
Read the LB again and perform ECC operation;
Compare the number and location of errors on second read to first read;
If error count on second read < first read, then at least one SE was corrected, remaining errors are hard errors (HEs);
If error count on second read = first read then all errors are hard;
Increment the counters for the HE locations;
If error weight in any of the four interleaves ≧ 3, then map out the LB, provided there are sufficient spare LBs;
End;

This scrubbing algorithm is not guaranteed to catch every hard error. Consider a single-bit error in a given byte. The true bit could be either a "0" or a "1", but the single-bit error causes the bit to be stuck, either at "0" or "1". Hence, there is a 50% chance that the bit read is correct, implying there is a 50% chance that the error will not be identified. Since the byte read from a given DRAM device 24 comes from a common column, a ROW failure will affect no more than 1 bit in any byte. Hence, in a given byte affected by a ROW failure, there is a 50% chance of the error not being identified. If a chip is dead, each bit read from the chip has a 50% change of being correct. With 8 bits in a byte, the probability that the byte read is correct is $(\frac{1}{2})^8 = 1/256$.

With this strategy, the 1024 spare logical block storage locations in the map hole 25 will be depleted on the third (total) chip failure, independent of map strategy at time $T=0$.

Time to Failure Distribution

It can be shown that board failure will definitely occur on the fifth chip failure, and that there are conditions that can lead to board failure between the fourth and fifth chip failures. Therefore, a conservative estimate of the time to board failure is the time to the fourth chip kill. Assuming a rate of 1000 failures per $10^9$ device-hours, and given 192 DRAMS on the board, the chip failure rate is approximately one every six years. Therefore, the Time To Failure (TTF) distribution for the board is approximately gamma with parameters lambda=1/6 and k=4. The following table gives the expected times to board failure in years for various percentiles (P) of interest:

| P | Years Until Failure |
| --- | --- |
| 0.01 | 4.0 |
| 0.05 | 6.6 |
| 0.10 | 8.3 |
| 0.50 | 16.4 |

Conclusion

By establishing a logical block having 544 bytes, the user memory 11 is arranged such that logical block address boundaries fall on bank boundaries, and the logical block is large enough to allow the Glover chip 14 to interleave to degree 4 without increasing the parity overhead. A disadvantage of this arrangement is that when an interleave accumulates enough errors to make the error weight value=3, the entire logical block must be mapped out. This will cause the spare logical blocks to be exhausted before the board fails, but the impact on the time to failure distribution is not particularly problematic.

Although only the preferred embodiment of the invention has been described herein, it will be apparent to one skilled in the art that changes and modifications may be made thereto without departing from the spirit and the scope of the invention as claimed.

We claim:

1. A fault-tolerant memory system (FTMS) for use an auxiliary memory device in conjunction with a host computer system comprising:
   a) user memory comprising at least one memory array constructed from off-specification dynamic random access memory (DRAM) devices (hereinafter "array") for storing user data and error correction data associated therewith, said user data being organized in blocks, each of which consists of a fixed number of bytes;
   b) a microprocessor-controlled computer system dedicated to the user memory (hereinafter "dedicated system"), said dedicated system performing the functions of serializing user data as it is received from the host computer system, deserializing the user data as it is returned to the host system, implementing an error correction code system for the blocks of user data; scrubbing the data stored in the user memory, remapping storage locations within the user memory as initial storage locations therein acquire too many hard errors for error correction to be effected with the stored error correction data, and performing host computer-interface operations; said dedicated system having:
   i) a microprocessor for executing all control functions related to dedicated system functions;
   ii) a read-only memory (ROM) for storing instructions related to dedicated system functions;
   iii) a full-specification random access memory for temporary storage of user data as it is being serialized or deserialized, dedicated system stack storage, establishing counters for tallying hard errors detected during scrubbing, and storage of other program operating variables for the dedicated system;
   iv) an error correction system for performing error correction code (ECC) operations on the user data stored within the user memory;
   v) an electrically-erasable programmable read-only memory (EEPROM) for storing an array map and storage quality indicators;
   vi) an interface controller for enforcing communication protocol between the FTMS and the host computer system;
   vii) a First-In/First-Out (FIFO) buffer for matching the speed of the interface controller with that of the microprocessor;
   viii) a parallel bus for transferring data within the dedicated system; and
   ix) direct memory access for rapid movement of data on the parallel bus.

2. The FTMS of claim 1, wherein the error correction system performs the following ECC operations;
   a) executes a first polynomial division which generates a series of check bytes for each block of user data, said series of check bytes being appended to its associated block of user data to form a logical block as the user data is being written to the user memory;
   b) executes a second polynomial division on each block of user data and its associated series of check bytes as it is being read from the user memory, said second polynomial division producing a remainder which, if equal to zero, indicates that no errors have occurred since the data was stored in the user memory or which, if not equal to zero, flags the dedicated system that errors have occurred.

3. The FTMS of claim 2, wherein the dedicated system, upon being flagged that errors have occurred, solves key error correction equations using instructions stored in said ROM in order to determine error locations and calculate error mask values.

4. The FTMS of claim 3, wherein said ECC operations are implemented entirely by software stored in the ROM of the dedicated system.

5. The FTMS of claim 3, wherein said ECC operations are implemented in an ECC chip.

6. The FTMS of claim 3, wherein the off-specification DRAM devices from which the user memory is constructed have a variety of defects which may include bad bits, an unacceptably-high soft error rate, and column or row continuity breaks which result in the disablement of a series of bits within the column or row so affected.

7. The FTMS of claim 6, wherein the dedicated system also scrubs data stored within the user memory in order to correct soft errors and identify hard errors.

8. The FTMS of claim 7, wherein a particular logical block is assigned a starting location within the user memory, identified by array number (A), array device column number (DCN), beginning bank number (BBN), and beginning row offset (BRO), on the basis of its assigned serialized number (LBN) in accordance with the following algorithm:

Where:

- A = the number of arrays within the system;
- B = the number of banks within each array;
- C = the number of DRAM devices per bank;
- N = the number of 8-bit bytes in a logical block;
- K = the number of bits per DRAM device column or row;
- M (the number of "masks") = the smallest integer such that B*C divides N*M with no remainder;
- T (the integer representing the number of passes through the B banks of an array to access M*N bytes of M LBs) = N*M/B*C;
- 8T (the number of device rows utilized to access M logical blocks) = 8N*M/B*C;
- $Q_c$ (the number of LBs that can be stored in all like-numbered device columns within an array) = INT(K/8T)*M;
- $Q_a$ (the number of LBs that can be stored within an array) = $Q_c$*K;

Then:

- A (the array number) is derived by dividing the logical block number (LBN) by INT(k/8T)*M*K; this gives a first integer quotient (a number between 0 and A) which is the array number, plus a remainder $R_1$;
- DCN (the array device column number) is a number between 0 and K, and is derived by dividing $R_1$ by INT(K/8T)*M, which results in a second integer quotient, which is DCN, and a remainder $R_2$;
- BBN (the LB's beginning bank number) = (B—$R_3$(B/M))module B; and $R_3$ is derived by dividing $R_2$ by M, which results in a third integer quotient $IQ_3$ plus remainder $R_3$; and
- If $R_3$ = 0, then BRO = $IQ_3$*8T;
- Else, if $R_3$ = 1, then BRO = ($IQ_3$*8T) + 8*B/M;
- Else, BRO = ($IQ_2$*8T) + 8*B/M + ($R_3$−1)(B/M+1)*8.

9. The FTMS of claim 8, wherein said dedicated computer system further comprises a look-up table within said ROM, which speeds access of a particular logical block by providing a BBN value and a BRO value in response to the input of an R1 value.

10. The FTMS of claim 9, wherein said user memory comprises both initial logical block storage locations and spare logical block storage locations.

11. The FTMS of claim 10, which further comprises:
a) a Logical Block Quality Indicator Bit (LBQIB) storage region with in said EEPROM, in which is stored an LBQIB for each initial logical block storage location within the user memory, the status of a LBQIB associated with a particular logical block storage location being changed by said microprocessor to reflect the defective nature of that storage location when the error weight of that storage location reaches a predetermined value;
b) a map record region within said EEPROM wherein a record is established by the microprocessor whenever an LBQIB associated with a particular logical block storage location is changed to denote the defective nature of that location, said record containing the logical block number and the address of the next available spare logical block storage location for rerouting the storage of the contents of the defective storage location;
c) instructions stored within said ROM which, whenever data is to be written to or read from a logical block storage location within said off-spec array, instruct said microprocessor to look up the LBQIB of the initial storage location of that logical block, and if the LBQIB indicates a defective location, said microprocessor searches said EEPROM and retrieves the record containing the beginning address of the assigned spare storage location for that logical block.

12. The FTMS of claim 11 wherein said interface controller is attached to a disk input/output channel of the host computer system.

13. The FTMS of claim 11, wherein said dedicated system further comprises:
a) a counter storage location within said full-specification RAM for maintaining a counter associated with each device within the user memory, each counter being reset to zero each time that a scrub cycle is completed for the entire array, a counter being incremented by "1" whenever a data storage error is detected with the DRAM device associated with that counter during a scrub cycle;
b) a Device Quality Indicator Bit (DQIB) storage location within said EEPROM for storing a DQIB associated with each device within the user memory in a section of said EEPROM, each DQIB being switchable between a first state and a second state, each DQIB being set to the first state at time zero to indicate that all DRAM devices within the array are deemed good; a DQIB being set to the second state when the counter associated that device is incremented to a predetermined value indicative of device failure.

14. The FTMS of claim 6, wherein the logical blocks are stored such that: individual bytes thereof are aligned in the predominant direction of serial bit failure within the off-specification DRAM devices; consecutive bytes within a logical block are stored within different devices; and no adjacent bytes stored within a device row or device column pertain to the same logical block.

* * * * *